United States Patent
Guleryuz et al.

(10) Patent No.: US 7,656,318 B2
(45) Date of Patent: Feb. 2, 2010

(54) OPTIMIZED CONTENT-BASED AND ROYALTY-BASED ENCODING AND DISTRIBUTION OF MEDIA DATA

(75) Inventors: Onur G. Guleryuz, San Francisco, CA (US); M. Reha Civanlar, Palo Alto, CA (US)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/020,792

(22) Filed: Jan. 28, 2008

(65) Prior Publication Data

US 2008/0181400 A1 Jul. 31, 2008

Related U.S. Application Data

(60) Provisional application No. 60/898,324, filed on Jan. 29, 2007.

(51) Int. Cl.
*H03M 7/34* (2006.01)
(52) U.S. Cl. .......................................... 341/51; 341/50
(58) Field of Classification Search ................... 341/50, 341/51; 455/508
See application file for complete search history.

(56) References Cited

U.S. PATENT DOCUMENTS

2007/0161386 A1 * 7/2007 Faber et al. .................. 455/508

OTHER PUBLICATIONS

Peng, Yin. et al., "Rate-Distortion Models for Video Transcoding," SPIE Conference on Image and Video Communications and Processing, Jan. 2003 (12 pages).

Jang et al. "RVC Textual Description 2.0," International Organisation for STandardisation Organisation Internationale de Normalisation ISO/IED JTC1/SC29/WG11, Coding of Moving Pictures and Audio, MPEG2006/N8041, Montreux Apr. 2006, (59 pages).

"Reconfigurable Video Coding Requirements v. 2.0," International Organisation for Standardisation Organisation Internationale de Normalisation ISO/IEC JTC1/SC29/WG11, Coding of Moving Pictures and Audio, Montreux, Switzerland, Apr. 2006.

Journal of the Audio Engineering Society Audio/Acoustics/ Applications, vol. 44, No. 12, Dec. 1996, ISSN 0004-7554 (3 pages).

"Joint Final Committee Draft (JFCD) of Joint Video Specification," (ITU-T Rec. H.264 ISO/IEC 14496-10AVC) , Joint Video Team (JVT) of ISO/IEC MPEG and ITU-T VCEG, JVT-D157, Oct. 10, 2002. (207 pages).

* cited by examiner

*Primary Examiner*—Jean B Jeanglaude
(74) *Attorney, Agent, or Firm*—Blakely, Sokoloff, Taylor & Zafman LLP

(57) ABSTRACT

A method and apparatus is disclosed herein for performing content-based and royalty-based encoding. In one embodiment, the method comprises: selecting one or more encoding tools to encode media based on a royalty cost associated with at least one of the one or more encoding tools and a corresponding decoding tool for each of the one or more encoding tools, decoded media quality that each corresponding decoding tool produces, and one or more transmission bandwidth constraints; encoding the media, in accordance with the media content, using the one or more encoding tools; and transmitting encoded data generated by at least one of the one or more encoding tools.

31 Claims, 9 Drawing Sheets

OPTIMIZED CONTENT-BASED AND ROYALTY-BASED ENCODING AND DISTRIBUTION OF MEDIA DATA

PRIORITY

The present patent application claims priority to and incorporates by reference the corresponding provisional patent application Ser. No. 60/898,324, titled, "Optimized Content-based and Royalty-Based Encoding and Distribution of Media Data", filed on Jan. 29, 2007.

FIELD OF THE INVENTION

The present invention relates to the field of encoding and distribution of media data; more particularly, the present invention relates to content-based and royalty-based encoding of media data.

BACKGROUND OF THE INVENTION

Media coding and delivery has seen substantial advances in recent years. With the amalgamation of compression and transport tools that define media standards, today one can transport media through a variety of networks using a vast range of tools that correspond to a vast range of efficiencies in the end-to-end delivery. If one is concerned with the highest efficiency media delivery, one is often confined to more recent, state-of-the-art tools that typically have high royalty/licensing costs. If, on the other hand, one allows some inefficiency, it may be possible to accomplish delivery with reduced royalty costs or even free of any royalty costs.

Media standards only allow for very limited exploitation of such trade-offs through profiles defined within a standard. One can also choose among different standards in order to realize such trade-offs. However, the available alternatives via profiles and different standards are few and often times not very meaningful for every application. As general purpose computing devices become ever more prevalent, it is clear that there are many scenarios that can benefit from a continuum of choices that allow for the optimal realization of such trade-offs.

Prior solutions define a very limited and coarse set of options an encoder can use in delivering media. If the encoder uses a given profile of a given standard the media delivery can be accomplished at a fixed license cost that covers the use of all tools in that profile. The encoder cannot optimize licensing costs for example based on the content of the media to be delivered, the desired media quality at the decoder, and the effective bandwidth of the transport medium. The situation is similar if the encoder can only choose among different media coding standards.

Tools included in media standards are selected and declared normative during the standardization process. This process happens in a way that can only coarsely accommodate all desired uses of media coding. Many good tools are not included in the final selection because they are not applicable to all envisioned scenarios, they are not amenable for efficient implementation on all envisioned hardware platforms, have reduced coding efficiency, etc.

Currently, some of the tools selected as normative within a media coding standard are utilized much more often than other normative tools. Yet their share from the pool of revenue obtained from standard licensing can be the same or even less than the other tools.

Media encoding using current techniques often require one to license a standard and pay royalties to the organization governing the standard's patent pool and/or individual IP holders. Once this is done, media is encoded by obtaining a license from content owners.

SUMMARY OF THE INVENTION

A method and apparatus is disclosed herein for performing content-based and royalty-based encoding. In one embodiment, the method comprises: selecting one or more encoding tools to encode media based on a royalty cost associated with at least one of the one or more encoding tools and a corresponding decoding tool for each of the one or more encoding tools, decoded media quality that each corresponding decoding tool produces, and one or more transmission bandwidth constraints; encoding the media, in accordance with the media content, using the one or more encoding tools; and transmitting encoded data generated by at least one of the one or more encoding tools.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
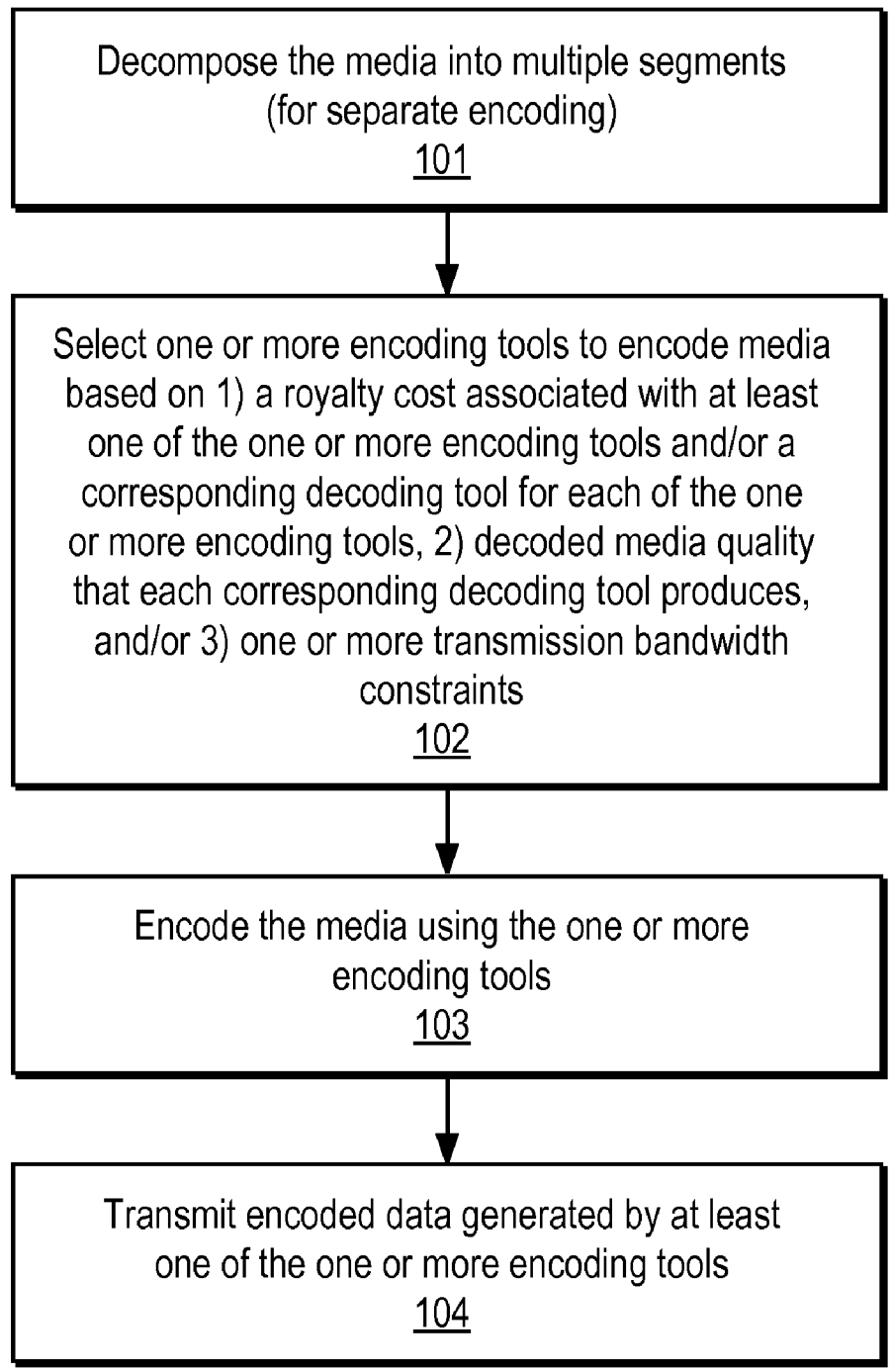
FIG. 1 is a flow diagram of one embodiment of a process for encoding and transporting media.

A method and system for encoding and distribution of media data are described. In one embodiment, the techniques described herein are designed to encode media such that the royalty cost of the tools used to encode and/or decode the media is taken into account in conjunction with decoded media quality and transmission bandwidth constraints. In one embodiment, the encoding is such that at the same decoded media quality, media encoded for high bandwidth environments can be decoded using lower efficiency but reduced royalty cost tools, whereas media encoded for low bandwidth environments can be decoded using higher efficiency but increased royalty cost tools. Such encoding can be done by optimizing performance over a function that describes optimal media encoding points for the allowed range of triplet values formed by decoded media quality, effective transmission bandwidth, and royalty cost. Let Q determine the set of possible tools, and let $Q(\omega, \rho)$, $B(\omega, \rho)$, $C(\omega, \rho)$ denote quality, bandwidth, and royalty cost respectively for a given subset $\omega$ of tools with tool parameters set to a vector of values $\rho$. Then, in one embodiment, for each targeted pair of bandwidth and royalty cost $(B_0, C_0)$, such a function determines the optimal quality point by solving $$Q_0 = \max_{\omega \subset \Omega, \rho, \lambda, \zeta} Q(\omega, \rho) + \lambda(B(\omega, \rho) - B_0) + \zeta(C(\omega, \rho) - C_0)$$

in order to obtain the optimal media encoding point $(Q_0, B_0, C_0)$.

The optimization can be done in a way to incorporate buffer constraints, for example, by introducing a variable b determining required buffer size together with a corresponding Lagrange multiplier $\gamma$ into the above equation, i.e., via $$Q_0 = \max_{\omega \subset \Omega, \rho, \lambda, \zeta, \gamma} Q(\omega, \rho) + \lambda(B(\omega, \rho) - B_0) + \zeta(C(\omega, \rho) - C_0) + \gamma(b(\omega, \rho) - b_0)$$

Other well-known optimization formulations that allow constraints based on inequalities can also be used. In a similar fashion, other encoding/decoding constraints (such as, for example, memory constraints, computational complexity constraints, decoding delay constraints, etc.) can also be introduced into the optimization. The techniques ensure that media delivery is performed in a way that fairly compensates holders of intellectual property (IP), so that users with loose constraints on decoded media quality and transmission bandwidth can benefit from reduced IP costs.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A method and system for encoding and distribution of media data is described. The method is designed to encode media, in accordance with the media content, such that the royalty cost of the tools used to encode and/or decode the media is taken into account in conjunction with decoded media quality and transmission bandwidth constraints. The encoding is such that at the same decoded media quality, media encoded for high bandwidth environments can be decoded using lower efficiency but reduced royalty cost tools, whereas media encoded for low bandwidth environments can be decoded using higher efficiency but increased royalty cost tools. Such encoding can be done by optimizing performance over a function that describes optimal media encoding points for the allowed range of triplet values formed by decoded media quality, effective transmission bandwidth, and royalty cost. The optimization can be done in a way to incorporate buffer and other encoding/decoding constraints. The system ensures that media delivery is done in a way that fairly compensates holders of intellectual property (IP), so that users with loose constraints on decoded media quality and transmission bandwidth can benefit from reduced IP costs.

In one embodiment, a system has a toolbox of media coding and transport tools is available with many tools of overlapping functionality. The system encodes media with a subset of available tools as selected by the encoding algorithm. The precise list of tools in the subset is signaled to the decoder which has access to the same toolbox. Then the bit-stream representing the coded media is delivered to the decoder which decodes the coded media with the known tools to reconstruct the media at a certain quality.

In one embodiment, each tool used in the media coding has a certain royalty cost which governs its use. The media itself may also have content licensing costs. In one embodiment, the system finds an optimal trade-off by encoding media in a way that minimizes the combined royalty cost given the desired media quality level and effective bandwidth of the transport medium. In one embodiment, the system also ensures that owners of content and IP are fairly compensated.

FIG. 1 is a flow diagram of one embodiment of a process for encoding and transporting media. The process is performed by processing logic that may comprise hardware (circuitry, dedicated logic, etc.), software (such as is run on a general purpose computer system or a dedicated machine), or a combination of both.

Referring to FIG. 1, the process begins by processing logic decomposing the media into multiple segments, which are to be encoded separately (processing block 101). Note that this is not a requirement and the media may be encoded as a single segment.

Next, processing logic selects one or more encoding tools to encode media based on 1) a royalty cost associated with at least one of the one or more encoding tools and/or a corresponding decoding tool for each of the one or more encoding tools, 2) decoded media quality that each corresponding decoding tool produces, and/or 3) one or more transmission bandwidth constraints (processing block 102). In one embodiment, a different encoding tool is selected for each segment. In another embodiment, a segment may be encoded multiple times with different encoding tools to allow segments of the media to be transported with different encodings according to desired quality and/or effective bandwidth.

In one embodiment, the selection of encoding tools comprises choosing optimal tool subsets to maximize quality for allowed ranges in one or both of effective bandwidth and royalty cost, to minimize royalty cost for allowed ranges in one or both of quality and effective bandwidth or to minimize bandwidth cost for allowed ranges in one or both of quality and royalty cost.

In one embodiment, the selection encoding tools is performed based on a function that describes media encoding points for an allowed range of triplet values formed by the decoded media quality, effective transmission bandwidth, and royalty cost associated with said at least one of the one or more encoding tools and a corresponding decoding tool for each of the one or more encoding tools. In one embodiment, processing logic constructs a three dimensional graph representing the function, where the graph includes a surface that defines achievable triplets of quality, bandwidth, and royalty cost for each segment, and the selection of encoding tools to encode segments of media is made from the achievable triplets. This is described in more detail below. In one embodiment, the function incorporates buffer and other encoding/decoding constraints. This may be done using a lagrange multiplier based or other constrained optimization framework discussed above in paragraphs 0019 and 0020 Such is well-known in the art. For example, see H. Everett, "Generalized Lagrange multiplier method for solving problems of optimum allocation of resources," Op er. Res., vol. 11, pp. 399-417, 1963.

In one embodiment, one of the encoding tools selected encodes the media such that at a substantially similar decoded media quality, media encoded for a high bandwidth environment can be decoded using lower efficiency but reduced royalty cost tools, whereas media encoded for low bandwidth environments can be decoded using higher efficiency but increased royalty cost tools.

Using the selected encoding tools, processing logic encodes the media, in accordance with the media content, using the one or more encoding tools (processing block 102).

Once encoded data has been generated, processing logic transmits encoded data generated by at least one of the one or more encoding tools (processing block 103).

Media, Segments, and Tool Sets

In one embodiment, media comprises audio, video, graphics, and/or auxiliary data. In one embodiment, video is encoded using the generic hybrid DPCM fashion, audio is encoded in a generic transform coding framework as is done in well known video and audio compression standards such as, for example, h.264/MPEG-AVC and MPEG-AAC, and coded media data is transported through a packet network such as, for example, the Internet.

In one embodiment, media data is considered in segments. The $i^{th}$ media segment represents the media data inside the time interval $[T_{i-1}, T_i)$ so that if there are S segments, $T_s-T_0$ denotes the duration of the media. In one embodiment, segmentations based on variables other than time or in addition to time are used (e.g., based on time and media quality for layered media coding applications). In one embodiment, a toolset $\Omega$ of media coding and transport algorithms is known to both the encoder and decoder.

In one embodiment, each tool in $\Omega$ has a royalty cost that determines the cost of licensing that tool for use in coding the media. In one embodiment, the royalty cost is flexible. For example, the cost can be fixed no matter how many times the tool is used during coding of the particular media data, it can be based on the number of times the tool is used during coding of the particular media data, it can depend on other tools used in coding of the particular media data (e.g., an otherwise royalty bearing tool may become royalty free if used together with royalty free tools in coding of the particular media data), it can be based on the expected quality of the decoded media (e.g., a video compression related tool may have different royalty costs when video is delivered to a device with a low resolution display as opposed to a high resolution display), it can be based on the equivalent bandwidth needed to transport the media data, it can be based on the application scenario (for example less royalty costs can be imposed when media is delivered to cell phones as opposed to HDTV sets, or the tool can become royalty free if used in a not for profit setting, etc.), it can be based on the licensing terms of the media content (e.g., the tool can become royalty free if used to code royalty free content), etc. In one embodiment, the royalty cost and licensing terms is a joint function of these conditions so that over different scenarios a tool or media data itself can have different royalty costs.

Figure 2:
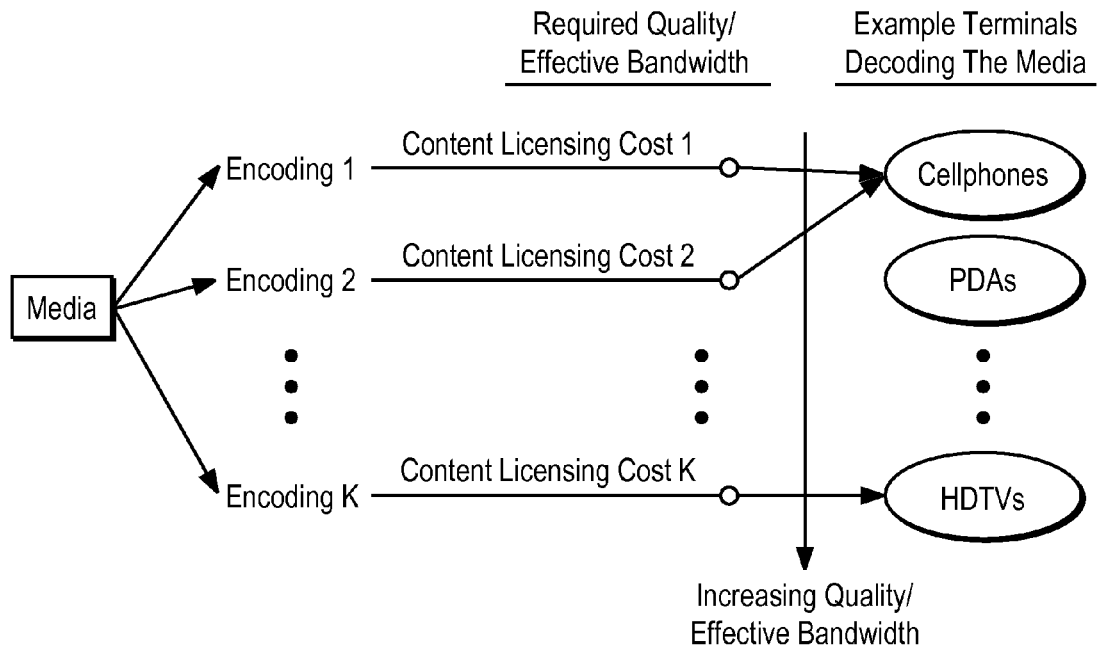
FIG. 2 is a block diagram showing different examples of media encodings targeting different devices and applications.

Content owner licensing terms and royalty costs can be varying with respect to different decoded media quality levels, utilized effective bandwidth, and the application for which media is delivered. FIG. 2 is a block diagram showing different examples of media encodings targeting different devices and applications. Referring to FIG. 2, media 201 is encoded K different ways to produce encodings 1-K. Encodings 1 and 2 may be designated to be decoded by cell phones, while other of encodings 3-K may be designated for decoding by PDAs, HDTVs, etc. Each of encodings 1-K results in different quality and has different effective bandwidth requirements. This results in potentially different royalty costs as determined by content owners.

Figure 3:
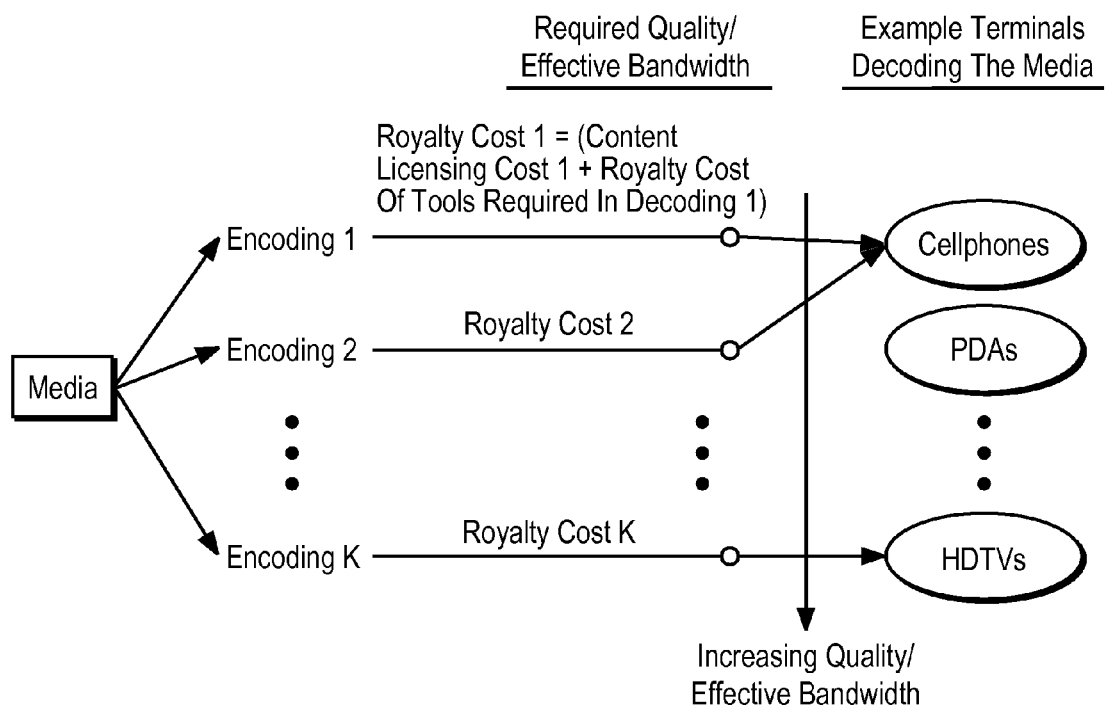
FIG. 3 shows a combined royalty cost required to generate each encoding.

With sophisticated royalty terms, the overall system can be thought of as different encodings of media incurring different royalty costs (e.g., the content licensing cost and tool licensing cost may be combined). FIG. 3 shows the combined royalty cost required to generate each encoding in FIG. 2. Referring to FIG. 3, each encoding uses a potentially different set of coding tools with different royalty costs.

In one embodiment, the royalty costs and conditions of each tool are stored in a registry, which takes the media coding conditions and determines a certificate $\phi_i$ for the $i^{th}$ segment. For purposes herein, these conditions are parameterized with a vector $\Gamma_i$ for segment i. In one embodiment, the vector $\Gamma_i$ contains the relevant conditions such as targeted media quality $Q_i$, effective bandwidth $B_i$, utilized tools $\Omega_i \subset \Omega$, various other encoding/decoding parameters such as frame rate, frame resolution, expected decoding delay, expected memory use, expected decoder computational complexity, expected encoder/decoder buffer fullness, etc. Other parameters include a number of frames in a segment, application type (particularly where it affects the licensing of tools), video type (e.g., news, movie, video conference, . . . ), video color/sampling space (e.g., YUV 4:2:0), number of bits per pixel, etc.

Figure 4:
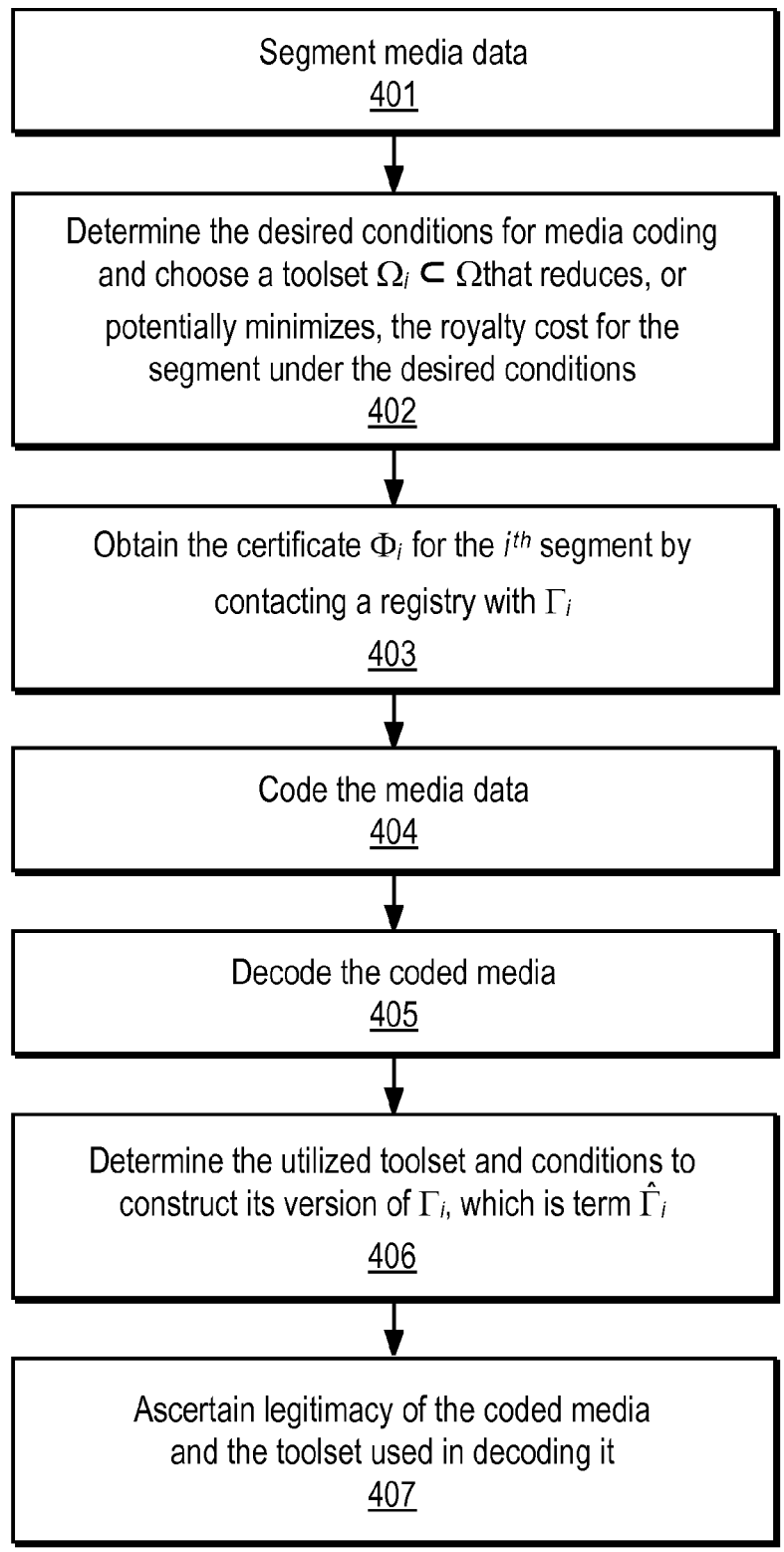
FIG. 4 is a flow diagram of another embodiment of a process for encoding and transport of media.

FIG. 4 is a flow diagram of another embodiment of a process for encoding and transport of media. The process is performed by processing logic that may comprise hardware (circuitry, dedicated logic, etc.), software (such as is run on a general purpose computer system or a dedicated machine), or a combination of both.

Referring to FIG. 4, the process begins by processing logic segmenting media data (processing block 401). For segment i of media data, processing logic in the encoder determines the desired conditions for media coding and chooses a toolset $\Omega_i \subset \Omega$ that reduces, or potentially minimizes, the royalty cost for the segment under the desired conditions (processing block 402). The conditions and the toolset are then put together inside vector $\Gamma_i$.

Figure 7:
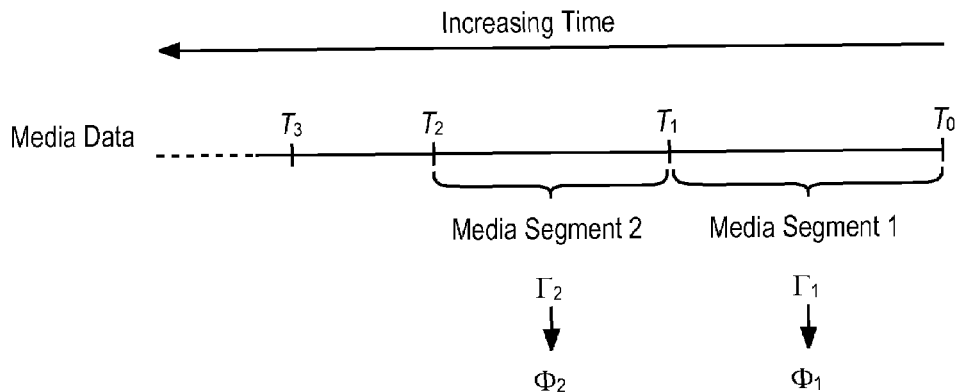
FIG. 7 is an example decomposition of media data into segments in time.

Next, processing logic in the encoder obtains the certificate $\phi_i$ for the $i^{th}$ segment by contacting a registry with $\Gamma_i$ (processing block 403). The registry is described in greater detail below. In one embodiment, media is decomposed into one segment for non-real time applications such as, for example, media streaming, and into segments of uniform length $\Delta T$ seconds in real time applications. $\Delta T$ can be 1, 2, 3, . . . 10, . . . 60, . . . 300, etc. FIG. 7 illustrates media decomposed into segments in time. Referring to FIG. 7, media segment 1 is from time $T_0$ to $T_1$, media segment 2 is from time $T_1$ to $T_2$, etc., as time in increasing. Each media segment has a vector $\Gamma_i$ that contains the relevant conditions, which in one embodiment are targeted media quality $Q_i$, effective bandwidth $B_i$, and utilized tools $\Omega_i \subset \Omega$ (but could include other conditions such as, for example, the various encoder/decoder parameters mentioned above that pertain to the media segment). Thus, media segment 1 has a vector $\Gamma_1$ associated with it; media segment 2 has a vector $\Gamma_2$ associated with it, etc. Similarly, each vector has a certificate associated with it. That is, vector $\Gamma_1$ has a certificate $\phi_1$ associated with it; vector $\Gamma_2$ has a certificate $\phi_2$ associated with it, etc.

Referring back to FIG. 4, after receiving the certificate, processing logic in the encoder codes the media data (processing block 404) and sends the coded media to a decoder together with the certificate $\phi_i$, the list of utilized tools, and coding parameters (processing block 404).

Once at the decoder, processing logic in the decoder decodes the coded media (processing block 405). In one embodiment, the decoder optionally determines the utilized toolset and conditions to construct its version of $\Gamma_i$, which is referred to herein as $\hat{\Gamma}_i$, for purposes herein (processing block 406). Using the vector $\hat{\Gamma}_i$, processing logic ascertains the legitimacy of the coded media and the toolset used in decoding it processing block 407). In one embodiment, the decoder transmits the vector $\hat{\Gamma}_i$ to the registry, which validates that the media and toolset are legitimate.

Once the $i^{th}$ segment is transported, the encoder proceeds with the coding of the remaining segments and the process of FIG. 4 repeats. In one embodiment, the granting of certificates associated with the remaining segments (processing block 403) is conditioned on the validation of one or more of the previous segments by the registry (processing block 407).

In one embodiment, rather than doing per-segment royalty cost optimization, the encoder optimizes the royalty cost of all segments jointly.

Figure 5:
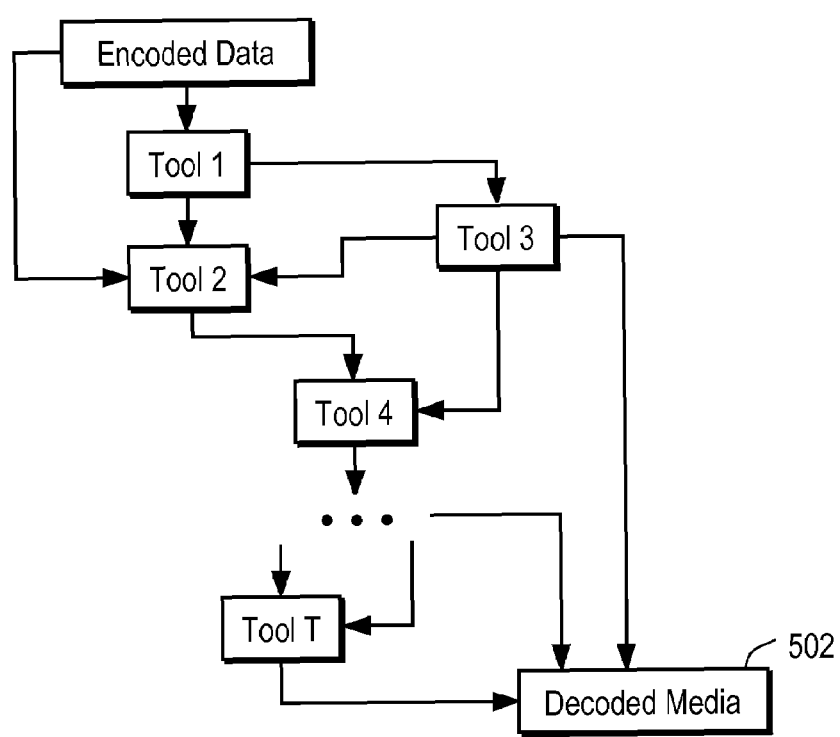
FIG. 5 illustrates an example of a dependency chain for tools used in decoding of media.

In one embodiment, the toolset $\Omega$ is determined as coding and transport algorithms contributed by IP holders of applicable compression and transport tools, and the tools in $\Omega_i \subset \Omega$ are signaled to the decoder using well known formats such as XML and RDL that allow the specification of the tools within a dependency graph. FIG. 5 illustrates an example of a dependency graph. Referring to FIG. 5, a media decoder 501 takes encoded data and, using a set of tools 1-T, or algorithms, decodes it to produce decoded media 502. Tools, which are labeled Tools 1-T, are interconnected so that the output of one tool can be utilized as the input of another tool to construct well-known media decoding possibilities.

Figure 6:
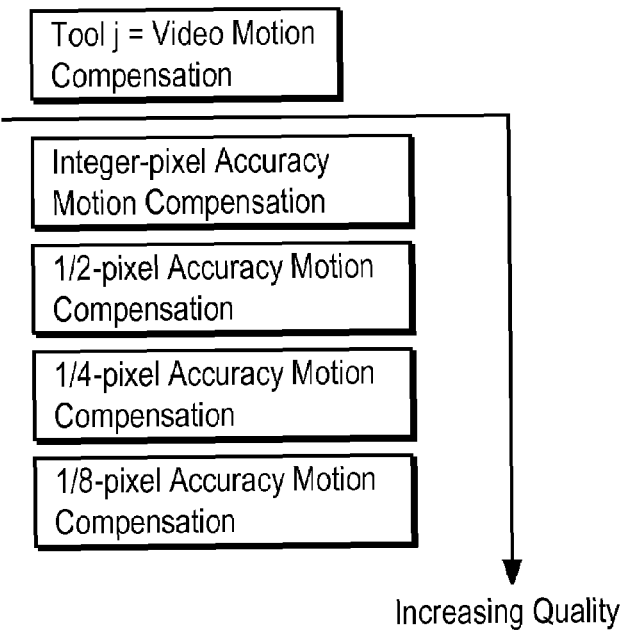
FIG. 6 shows an example set of tools of equivalent functionality.

Tool specification parts of the currently developed MPEG-RVC standard can also be used to package the information to enable a decoder to identify which encoding tools were used to generate the encoded data. In one embodiment, within the dependency graph, tools of equivalent functionality are used in place of a particular tool or in place of a multitude of tools. FIG. 6 shows an example set of tools of equivalent functionality. Referring to FIG. 6, a set of tools/algorithms and motion compensation algorithms that can be used in decoding compressed video is shown. The tools get progressively more advanced as they allow the accounting for higher accuracy motion compensation (from integer-pixel accuracy to ⅛-pixel accuracy). With more advanced versions better quality can be obtained.

An Example of a Media Encoding and Distribution System

Figure 8:
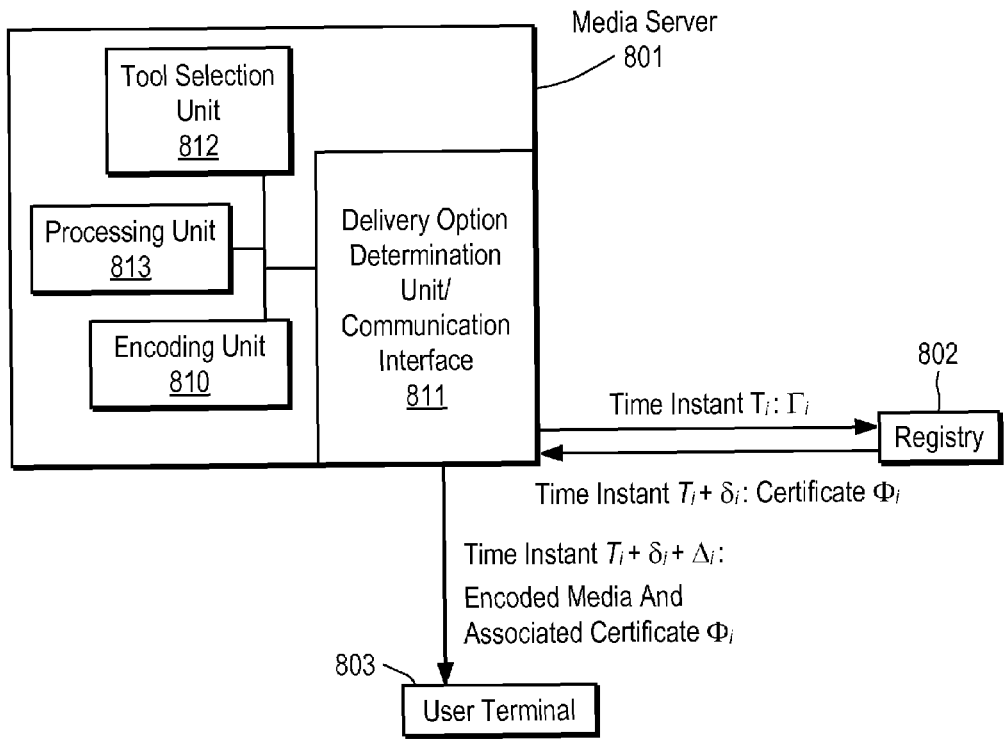
FIG. 8 shows an example generation of a certificate for a segment.

FIG. 8 is a block diagram of a media encoding and distribution system that includes a registry that is responsible for certificate generation. Referring to FIG. 8, a media server 801 is communicably coupled to a registry 802 and one or more user terminals 803. This coupling may be a direct connection or a coupling with one or more intervening elements. For example, in one embodiment a media server 801 is communicably coupled to a registry 802 and one or more user terminals 803 over a network (e.g., packet-based network, Internet, etc.).

As discussed above, in one embodiment, media server 801 includes a processing unit 813 that performs media processing operations described herein, including media decomposition, segmentation, vector generation and processing, and many other operations not performed by the other functional units of media server 801. In one embodiment, media server 801 also includes an encoding unit 820 to encode segments of the media using one or more encoding tools. In one embodiment, media server 801 includes a communication interface 811 to communicate to the user. The communication interface 811 may provide different delivery options to a user. The different delivery options may be associated with differences in decoded media quality and/or differences in transmission bandwidth constraints and the different delivery options may be selected for presentation based on one or more encoding parameters. In one embodiment, in such a case, a tool selection unit 812 in media server 801 selects the one or more encoding tools based on a selection of one of the delivery options by the user that is received by the interface and/or based on one or more encoding parameters. For example, in the quality bandwidth plane, the following options may be provided:

|  | Streaming: Spiderman3 | | |
| --- | --- | --- | --- |
|  | 200 kbps | 500 kbps | 1 mbps |
| High quality | NA | $13 | $10 |
| Intermediate | $14 | $10 | $6 |
| Low | $8 | $4 | $0 |

In one embodiment, the interface may dynamically adjust the price of the presented options based on customer demand for the options. Customer demand may be measured in the last T seconds, where T may be 1, 2, 51, 600, 1000000, or any time interval.

Using processing unit 813, media server 801 decomposes media into segments and provides the vector $\Gamma_i$ that contains the relevant conditions to registry 802. In one embodiment, the vector $\Gamma_i$ of segment i contains targeted media quality $Q_i$, effective bandwidth $B_i$, utilized tools $\Omega_i \subset \Omega$. In one embodiment, registry 802 is a trusted server that stores royalty costs and provides certificates. Thus, in response to the vector $\Gamma_i$ that contains the relevant conditions from media server 801 for the $i^{th}$ segment, registry 802 provides a certificate $\phi_i$ for the $i^{th}$ segment. In one embodiment, for real time applications, registry 802 is consulted for each segment so that a certificate can be obtained.

In one embodiment, the registry certificates cover the licensing of the coding tools as well as the licensing of the media from media content owners. In one embodiment, registry 802 may be contacted by IP and content owners. In this way, IP and content owners are allowed to monitor the licensing and legitimate use of media. Thus, a combined certificate that permits the licensing of the utilized tools and the transported media can be obtained from a single body in a way that is beneficial to a licensee and standard's patent pool and/or individual IP holders. Very broad range of licensing terms may be allowed. That is, system content owners and technological IP owners can define a continuum of licensing terms which enables new applications that previously were not possible due to prohibitive licensing costs. Thus, easy and dynamic securing and distribution of licenses are allowed so that IP and content can be legitimately and fairly used.

In one embodiment, a fine set of possibilities are defined for media delivery to disparate devices and applications so that IP and content owners are fairly compensated. Furthermore, in one embodiment, tools that are not selected for normative standardization are allowed to contribute in niche applications that benefit from these tools. In this manner, owners of normative tools within a media coding standard, as well as owners of tools that are not selected for normative standardization, can be compensated fairly.

Encoder unit 810 in media server 801 may be responsible for communicating with registry 802 via communication interface 811. In one embodiment, for non-real time applications, the encoder may obtain certificates in advance of all media transmission so that registry 802 is not consulted during media delivery.

Figure 9:
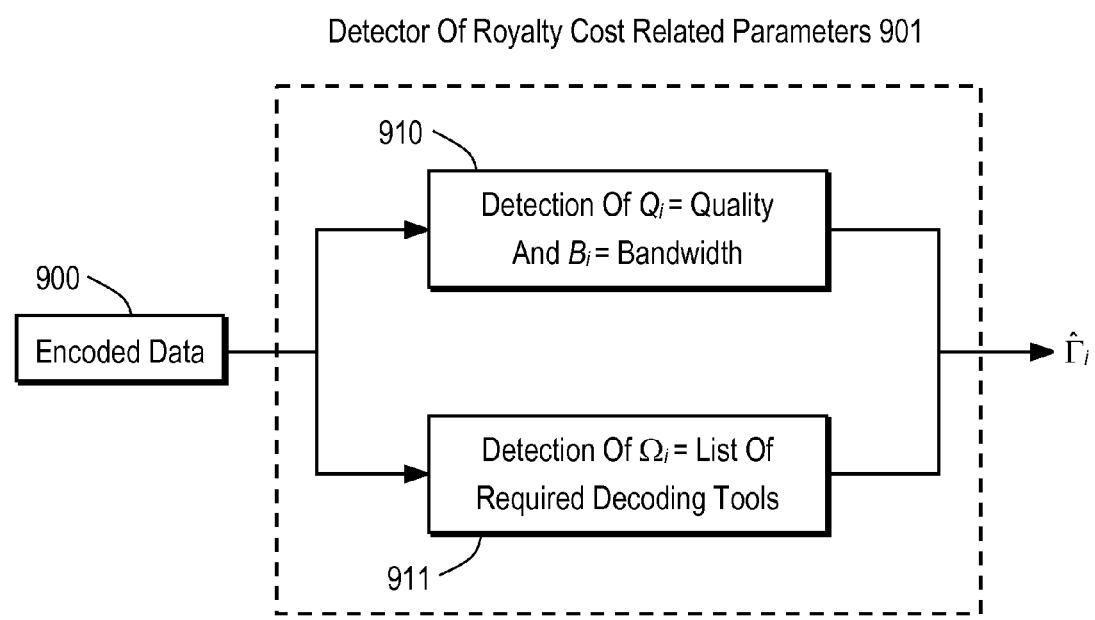
FIG. 9 shows an example technique for obtaining $\hat{\Gamma}_i$ from encoded media.

After obtaining the certificate, media server 801 provides the encoded media and associated certificate to user terminal 803. In one embodiment, user terminal 803 includes a decoder to decode the encoded media. User terminal 803 also includes a detector to detect royalty cost related parameters from the coded media data. The detector may be a part of the decoder. FIG. 9 is a block diagram of one embodiment of a detector that detects parameters that are related to determining royalty costs from encoded media. Referring to FIG. 9, detector 900 receives encoded data 900 and includes two detection units that perform two types of detection. Detection unit 910 detects the targeted media quality $Q_i$ and effective bandwidth $B_i$, while detection unit 911 detects utilized tools $\Omega_i \subset \Omega$ required for decoding. Detector 900 outputs a vector $\hat{\Gamma}_i$ of segment i.

In one embodiment, the detector reports $\hat{\Gamma}_i$ to the registry (e.g., registry 802) or to another reporting server at randomly selected segments so that a certain percentage of the segments are used in reporting. This percentage can be a number of different percentages such as, for example, 1%, 7%, 10%, 43%, etc. The detector (or decoder) of the user terminal is also polled by the registry or reporting server to report $\hat{\Gamma}_i$ for the most recent k segments (k=1, 2,7,49, etc.)

In another embodiment, certificates are obtained by user terminal 803. In such a case, user terminal 803 communicates with a registry, such as registry 802 (shown as a dotted line).

Figure 13:
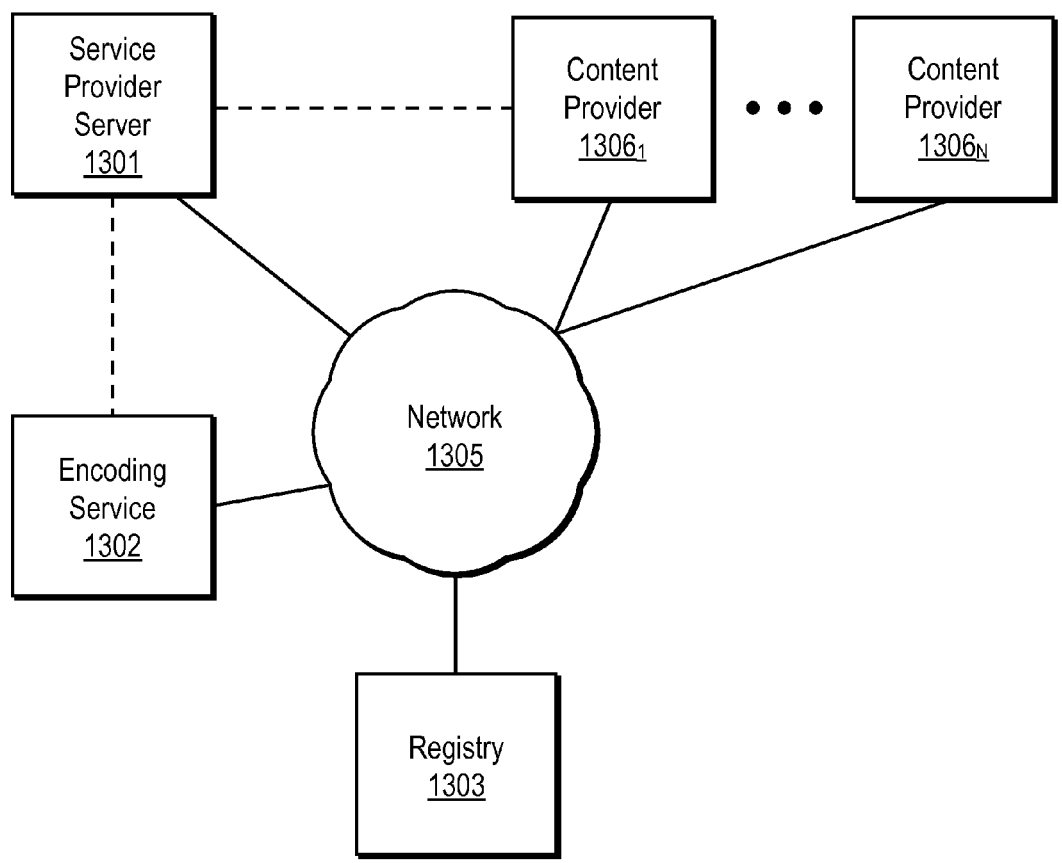
FIG. 13 illustrates another embodiment of a content distribution system.

FIG. 13 illustrates another embodiment of a content distribution system. Referring to FIG. 13, the system includes at least one service provider server 1301 to serve content to one or more customers in encoded form. The system also includes one or more contents provider servers $1306_1$-$1306_N$ to provide the content to the server 1301. The content provider(s) may be part of server 1301. An encoding service 1302 is included to encode the content. The encoding service 1302 encodes the content using an encoder selected based on royalty costs. The encoding service may be part of the server 1301. Registry 1303 communicably coupled to the server 1301 to maintain a record of a certificate associated with at least one portion of the content. As discussed above, the certificate is used for verification of encoded data. These units may be directly coupled to each other or communicably coupled via a network like network 1305.

Achievable Decoded Media Quality

Figure 10:
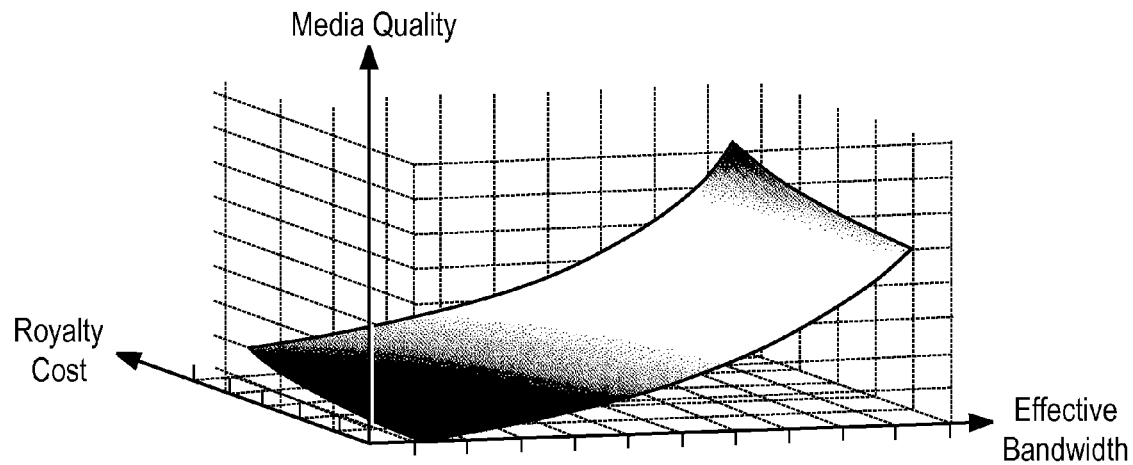
FIG. 10 shows an example achievable surface for a segment.

In one embodiment, the encoder selects encoding tools for tool set $\Omega$ using an achievable surface for each media segment. The encoder, or other device, constructs the achievable surface for each media segment to facilitate selection of a tool to provide a particular media quality for a given effective bandwidth and royalty cost. This surface can be generated by encoding the media segment in all possible ways as allowed by the tools in $\Omega$ so that the subset of tools that generates the highest quality for given effective bandwidth and royalty cost determines the intercept of the surface at that bandwidth and royalty cost. FIG. 10 illustrates an example surface defined by achievable [quality, bandwidth, royalty cost] triplets. Referring to FIG. 10, all triplets below the surface are considered "achievable."

Figure 11:
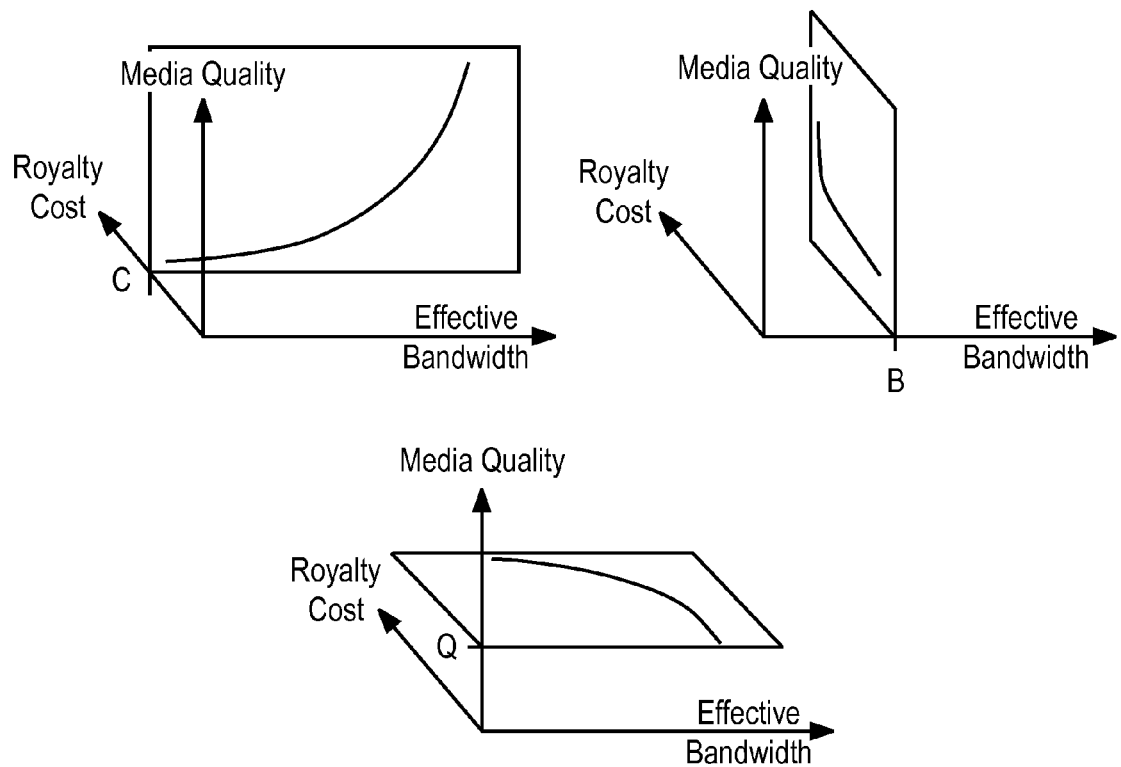
FIG. 11 shows example cuts from the achievable surface showing pair-wise dependencies.

A pair wise dependency over a surface such as shown in FIG. 10, showing the effect of variations in two of the three parameters—quality, effective bandwidth, royalty cost— while the third parameter is kept constant, can also be obtained. FIG. 11 illustrates an example of cuts from the surface showing pair wise dependencies.

The graph may be represented in many other ways. For example, in one embodiment, the graph is represented as a table. In other embodiments, the graph is represented using simpler functions and associated parameters. In another embodiment, a program that takes the inputs to the function and produces the output of the function. These are just examples, but many others are available.

In one embodiment, the encoder generates the achievable surface using parameterized, model based approximations. In one embodiment, the parameters for these approximations are determined from the media being coded (e.g., for video frame-level standard deviation or other statistics of pixel intensity and statistics that quantify motion activity can be used, for audio statistics that quantify frequency richness can be used, etc.). The models can be formed using well-known rate-distortion or rate-perceptual quality models using allowed subsets of tools. One such model is described in Yin, et al, "Rate-Distortion Models for Video Transcoding", SPIE Conference on Image and Video Communications and Processing, Vol. 5022, pp. 467-488, January 2003.

In one embodiment, once the surface is generated for the desired range in [quality, effective bandwidth, royalty cost] triplets of interest, the encoder chooses the tool subset that maximizes quality for allowed ranges in [effective bandwidth, royalty cost] or that minimizes royalty cost for allowed ranges in [quality, effective bandwidth], or that minimizes bandwidth cost for allowed ranges in [quality, royalty cost].

Note that tools that are not included in the final selection of a media standard because they are not applicable to all envisioned scenarios, they are not amenable for efficient implementation on all envisioned hardware platforms, have reduced coding efficiency, etc. can be viable since the utilized subset of tools is determined adaptively, and efficiency is all but one aspect of the selection process.

An Example of a Computer System

Figure 12:
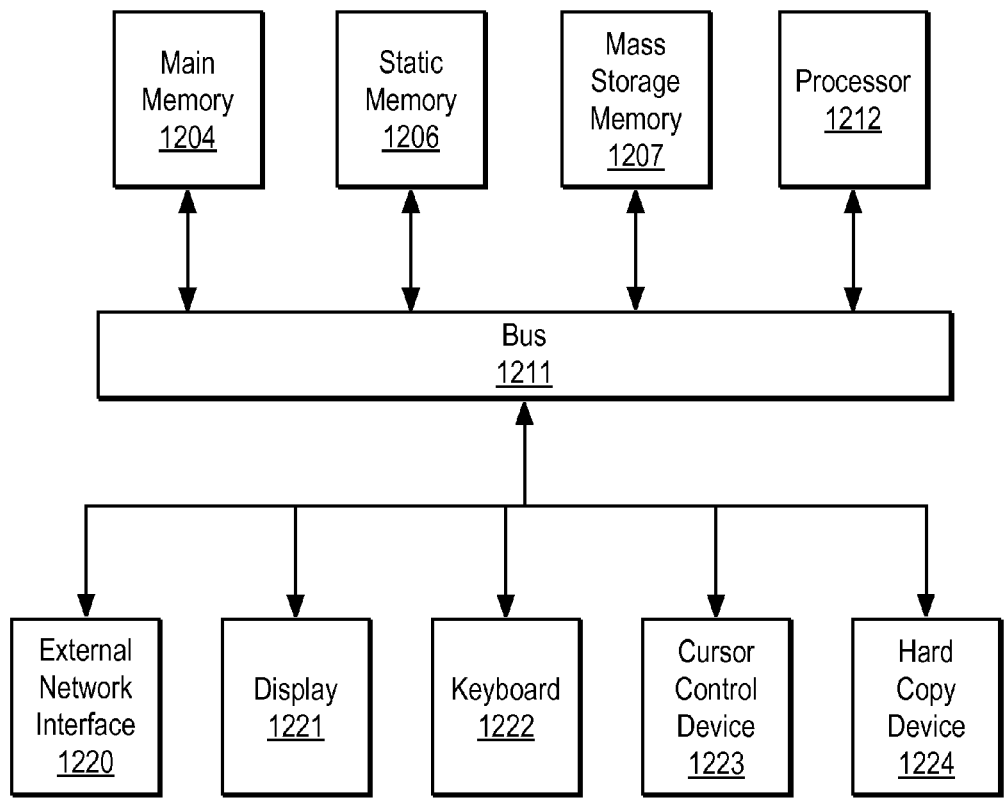
FIG. 12 is a block diagram of one embodiment of a computer system.

FIG. 12 is a block diagram of an exemplary computer system that may perform one or more of the operations described herein. Referring to FIG. 12, computer system 1200 may comprise an exemplary client or server computer system. Computer system 1200 comprises a communication mechanism or bus 1211 for communicating information, and a processor 1212 coupled with bus 1211 for processing information. Processor 1212 includes a microprocessor, but is not limited to a microprocessor, such as, for example, Pentium™ processor, PowerPC™ processor, etc.

System 1200 further comprises a random access memory (RAM), or other dynamic storage device 1204 (referred to as main memory) coupled to bus 1211 for storing information and instructions to be executed by processor 1212. Main memory 1204 also may be used for storing temporary variables or other intermediate information during execution of instructions by processor 1212.

Computer system 1200 also comprises a read only memory (ROM) and/or other static storage device 1206 coupled to bus 1211 for storing static information and instructions for processor 1212, and a data storage device 1207, such as a magnetic disk or optical disk and its corresponding disk drive. Data storage device 1207 is coupled to bus 1211 for storing information and instructions.

Computer system 1200 may further be coupled to a display device 1221, such as a cathode ray tube (CRT) or liquid crystal display (LCD), coupled to bus 1211 for displaying information to a computer user. An alphanumeric input device 1222, including alphanumeric and other keys, may also be coupled to bus 1211 for communicating information and command selections to processor 1212. An additional user input device is cursor control 1223, such as a mouse, trackball, trackpad, stylus, or cursor direction keys, coupled to bus 1211 for communicating direction information and command selections to processor 1212, and for controlling cursor movement on display 1221.

Another device that may be coupled to bus 1211 is hard copy device 1224, which may be used for marking information on a medium such as paper, film, or similar types of media. Another device that may be coupled to bus 1211 is a wired/wireless communication capability 1225 to communication to a phone or handheld palm device.

Note that any or all of the components of system 1200 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    selecting one or more encoding tools to encode media based on a royalty cost associated with at least one of the one or more encoding tools and a corresponding decoding tool for each of the one or more encoding tools, decoded media quality that each corresponding decoding tool produces, and one or more transmission bandwidth constraints;
    encoding the media, in accordance with the media content, using the one or more encoding tools; and
    transmitting encoded data generated by at least one of the one or more encoding tools.

2. The method defined in claim 1 further comprising decomposing the media into a plurality of segments, and wherein encoding the media comprises encoding each of the plurality of segments.

3. The method defined in claim 2 further comprising constructing a three dimensional graph with a surface defining achievable triplets of quality, bandwidth, and royalty cost for each segment, wherein selecting the one or more encoding tools to encode each segment is made from the achievable triplets.

4. The method defined in claim 2 further comprising:
    obtaining at least one certificate for each segment; and
    sending the transmitted encoded data and its associated certificate to a decoder, along with a list of any encoding tools used to encode the transmitted encoded data and one or more coding parameters.

5. The method defined in claim 1 further comprising decoding the encoded data.

6. The method defined in claim 5 further comprising:
    determining the list of encoding tools and conditions under which encoding tools in the list were selected;
    sending the list of encoding tools and the conditions to a registry to ascertain legitimacy of the media and the list of encoding tools.

7. The method defined in claim 1 further comprising detecting one or more royalty cost related parameters from the coded media data.

8. The method defined in claim 1 wherein selecting one or more encoding tools comprises choosing optimal tool subsets to:
maximize quality for allowed ranges in one or both of effective bandwidth and royalty cost;
minimize royalty cost for allowed ranges in one or both of quality and effective bandwidth; or
minimize bandwidth cost for allowed ranges in one or both of quality and royalty cost.

9. The method defined in claim 1 wherein at least one of the encoding tools selected encodes the media such that at a substantially similar decoded media quality, media encoded for a high bandwidth environment can be decoded using lower efficiency but reduced royalty cost tools, whereas media encoded for low bandwidth environments can be decoded using higher efficiency but increased royalty cost tools.

10. The method defined in claim 1 wherein selecting the one or more encoding tools is performed based on a function that describes media encoding points for an allowed range of triplet values formed by the decoded media quality, effective transmission bandwidth, and royalty cost associated with said at least one of the one or more encoding tools and a corresponding decoding tool for each of the one or more encoding tools.

11. The method defined in claim 10 wherein the function incorporates buffer constraints.

12. The method defined in claim 1 further comprising obtaining a certificate for each segment of the media encoded prior to transmitting the encoded data.

13. The method defined in claim 1 further comprising sending a user an indication of a number of different delivery options, each delivery option being associated with at least one of the decoded media quality and a transmission bandwidth constraint; wherein selecting the one or more encoding tools is based on user selection of one of the different delivery options.

14. The method defined in claim 13 further comprising dynamically adjusting one or more of the different delivery options based on user demand.

15. A media server comprising:
a tool set selection unit to select encoding tools to encode video segments based on encoding parameters; and
an encoder coupled to the tool set selection unit to segment video into a plurality of segments and encode each of the plurality of segments using tools selected by the tool set selection unit based on encoding parameters provided by the encoder.

16. The media server defined in claim 15 further comprising: an interface to obtain a certificate for each segment of the media encoded prior to transmitting the encoded data.

17. The media server defined in claim 15 further comprising an interface to send a user an indication of a number of different delivery options, each delivery option being associated with at least one of the decoded media quality and a transmission bandwidth constraint, wherein the tool set selection unit selects the one or more encoder tools based on user selection of one of the different delivery options.

18. The media server defined in claim 17 wherein the interface adjusts one or more of the different delivery options based on user demand.

19. The media server defined in claim 15 wherein the encoder selects the encoding tool for at least one of the plurality of segments based on a best royalty cost for a given quality and bandwidth.

20. The media server defined in claim 15 wherein the encoder packages the encoded video segments using MPEG RVC.

21. A system to enable media delivery transactions, the system comprising:
a media server comprising
a tool set selection unit to select encoding tools to encode segments of media based on parameters that include quality, bandwidth, and royalty costs, and
an encoder coupled to the tool set selection unit to segment the media into a plurality of segments and encode each of the plurality of segments using tools selected by the tool set selection unit based on the parameters provided by the encoder, the encoder distributing a bitstream of encoded video data to another location in the system; and
a registry communicably coupled to the media server to maintain an indication of which tools are used by the media server to encode the video content.

22. The system defined in claim 21 wherein the registry generates a certificate for each segment to be encoded by the encoder, the certificate for verifying the legitimacy of the encoded data corresponding to said each segment and being transmitted at part of the bitstream by the encoder.

23. The system defined in claim 22 wherein the certificate specifies the encoding tool used by the encoder to generate the encoded data corresponding to said each segment.

24. The system defined in claim 21 wherein the registry keeps track of content and royalty cost, an indication of which tools are used by the encoder and the quality and bandwidth at which the media is delivered.

25. The system defined in claim 21 wherein the registry stores royalty costs and conditions associated with each of the plurality of tools and determines a certificate for each segment in response to media coding conditions.

26. The system defined in claim 25 wherein the media coding conditions comprise at least one of a group consisting of effective bandwidth, targeted media quality, and one or more of parameters associated with either or both of the encoder and decoder at a beginning of the segment.

27. The system defined in claim 26 wherein the tool set selection unit selects from a plurality of different encoding tools that each have different pricing and that result in decoded data of different quality at the same bandwidth.

28. An article of manufacture having one or more computer-readable storage medium storing instructions thereon which, when executed by a system, cause the system to perform a method comprising:
selecting one or more encoding tools to encode media based on a royalty cost associated with at least one of the one or more encoding tools and a corresponding decoding tool for each of the one or more encoding tools, decoded media quality that each corresponding decoding tool produces, and one or more transmission bandwidth constraints;
encoding the media, in accordance with the media content, using the one or more encoding tools; and
transmitting encoded data generated by at least one of the one or more encoding tools.

29. The article of manufacture defined in claim 28 wherein the method further comprises:
obtaining at least one certificate for each segment; and
sending the transmitted encoded data and its associated certificate to a decoder, along with a list of any encoding tools used to encode the transmitted encoded data and one or more coding parameters.

30. The article of manufacture defined in claim 28 wherein the method further comprises:

decoding the encoded data;

determining the list of encoding tools and conditions under which encoding tools in the list were selected; and sending the list of encoding tools and the conditions to a registry to ascertain legitimacy of the media and the list of encoding tools.

31. A system comprising:

a server of a service provider to serve content to one or more customers in encoded form;

one or more contents provider servers to provide the content to the server;

an encoding service to encode the content, wherein the encoding service encodes the content using an encoder selected based on royalty costs; and a registry communicably coupled to the server to maintain a record of a certificate associated with at least one portion of the content, the certificate used for verification of encoded data of the at least one portion of the content.

* * * * *